United States Patent [19]

Nixel

[11] 4,201,050
[45] May 6, 1980

[54] FLUID COUPLING

[75] Inventor: Fritz Nixel, Grimmschwinden, Fed. Rep. of Germany

[73] Assignee: Voith Turbo GmbH & Co., KG, Crailsheim, Fed. Rep. of Germany

[21] Appl. No.: 970,277

[22] Filed: Dec. 18, 1978

[30] Foreign Application Priority Data

Dec. 22, 1977 [DE] Fed. Rep. of Germany ....... 2757252

[51] Int. Cl.² .............................................. F16D 33/06
[52] U.S. Cl. ........................................ 60/357; 60/359; 60/337
[58] Field of Search ................. 60/337, 347, 352, 357, 60/358, 359

[56] References Cited

U.S. PATENT DOCUMENTS 3,405,524  10/1968  Nelden ..................................... 60/337
4,023,362  5/1977  Rognër et al. ...................... 60/357 X Primary Examiner—Edgar W. Geoghegan
Attorney, Agent, or Firm—Ostrolenk, Faber, Gerb & Soffen

[57] ABSTRACT

A rotating fluid coupling of the type which has a primary coupling half and a secondary coupling half which together form a working chamber which is filled with working fluid. A control device which is arranged on the secondary coupling half is used to regulate the rotary take-off drive speed of the coupling by comparing an operating value, such as the centrifugal force which is a result of the rotating drive speed, with a variable command value and when the operating value differs from the command value initiates adjustment of the rotary drive speed. A fluid container on the secondary coupling half revolves with the secondary coupling half. A stationary supply line for control fluid to the fluid container is provided with a permanent outlet opening at a distance from the axis of rotation of the fluid coupling. A control piston is provided, the operating surface of which is spaced from the inner surface of the centrifugally driven fluid surface by a distance which locates the operating surface approximately at the permanent outlet opening. The control is thus independent of the rotary speed of the coupling. Some slight drift may occur during a change in speed until the forces balance out, but such variation in control is only momentary and the drifting is thus minimal.

12 Claims, 4 Drawing Figures

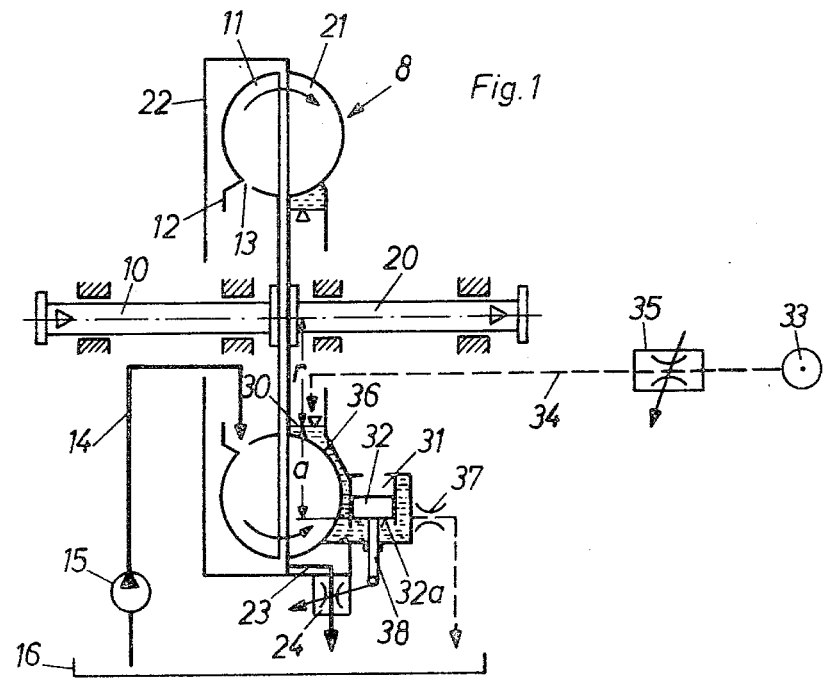
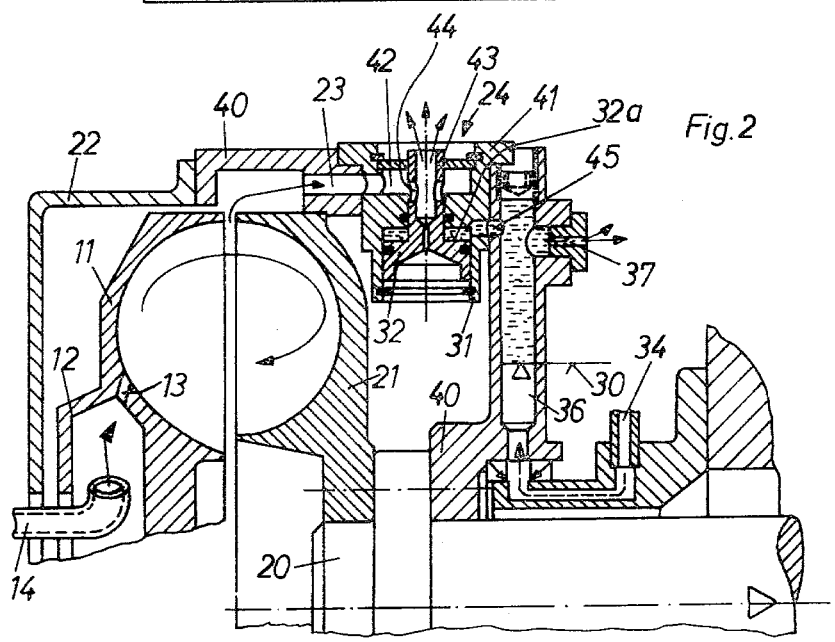

FLUID COUPLING

The invention relates to a fluid coupling, preferably a hydrodynamic coupling, of the kind having a primary coupling half and a secondary coupling half which together form a working chamber which can be filled with working fluid, and with a control device which is arranged on the secondary coupling half and is used to regulate the rotary drive speed of the coupling by comparing an operating value, such as the centrifugal force, which operating value depends on the rotary drive speed, with a variable command value, and when the operating value differs from the command value, initiates adjustment of the rotary drive speed.

BACKGROUND OF THE INVENTION

In a fluid coupling of this kind, the coupling slip can be adjusted during operation. Thus, with approximately constant rotary input speed, the rotary take-off drive speed of the coupling may also be adjusted.

In one known fluid coupling of this type (see German Offenlegungsschrift No. 26 12 133) the control device revolving with the secondary coupling half has a power comparing element and equalizer comprising a control piston which can be displaced in the radial direction, relative to the rotary axis of the coupling. This piston is loaded on one side by a centrifugal force (an operating value), which is dependent upon the output speed (a controlled variable). The piston is loaded on the other side, counter to the centrifugal force, by a variable spring force which can be adjusted by means of a temperature sensor and which provides an adjustable and variable command value. To adjust the rotary drive output speed when the operating or controlled variable value differs from the command value, the following provision is made:

The control piston simultaneously forms the movable valve element of a control valve which controls a flow of pressure medium extending to a regulating piston. The regulating piston displaces an annular or cylindrical slide valve, which projects into the working chamber of the coupling, thereby restricting to a greater or lesser extent the circulation of fluid in the working chamber.

In another embodiment of a known coupling the control device varies the degree to which the working chamber of the coupling is filled.

A known fluid coupling may be used in particular for driving a cooling fan. In this instance, it is possible to adjust the rotary drive output speed of the fluid coupling as a function of a change in temperature, a change which can be measured directly at the rotating parts of the coupling, in order thereby to adapt the output flow of the cooling fan automatically to the cooling requirement.

This known fluid coupling arrangement is not, however, (at least without involving other measures), capable of regulating the rotary take-off drive or output speed of the fluid coupling to a value which is preset by an adjustment device which is separate from the rotating parts of the couplings, i.e. one which depends on a command value which is to be transmitted to the coupling from an outside source. However, the latter type of operation is necessary for many applications of fluid couplings, including the driving of a conveyor belt, the operating speed of which should be capable of being set from a control center, or the driving of a pump, the supply pressure or supply flow of which is to be held at a given value by varying the rotary speed.

In all of these cases, it is difficult to transmit the command value from a remote location to the fluid coupling in such a way that a precise, e.g. linear, relationship is established between the command value and the rotary take-off speed of the coupling. The difficulty lies in the fact that the command value may be falsified during its transmission from a stationary part to a rotating part, or, after being transmitted to a rotating part, as a result of a change in the rotary speed, or may be changed after transmission to the rotating part possibly with variation in the speed of rotation.

A known method of controlling the filling level and thus the rotary take-off or output drive speed of a hydrodynamic coupling according to a command value supplied externally consists of providing an external working fluid circuit, i.e. continuously removing working fluid from the coupling and continuously supplying working fluid which is preferably cooled and, for example, varying the amount of working fluid conducted away. For this purpose, an outlet valve revolving with the coupling may be provided (see German Pat. No. 1,600,974). However, this requires a relatively complicated adjustment mechanism.

It is also known to provide an adjustable scooping tube (see the publication "Voith Getrieberegelkupplungen," Cr 101, especially Page 10). In this instance, the hydraulic scooping tube control is actuated from an adjustment gear via a cam plate. With the aid of the cam plate, it is possible for a specific setting of the adjustment gearing to be associated with a specific rotary drive speed. The disadvantage of this construction lies in the relatively high cost of the scooping tube and its control and in the fact that it is frequently very difficult to determine the correct shape for the cam plate.

Finally, hydrodynamic couplings with external circuits are known for example, see German Offenlegungsschrift No. 26 14 476, in which the flow of working fluid supplied can be varied by means of an inlet valve. However, even in this type of coupling, it is very difficult to establish a precise relationship between the command value (the flow of fluid supplied) and the rotary drive speed. It is impossible to achieve a precise proportional relationship.

SUMMARY OF THE INVENTION

An object of the present invention is to design a fluid coupling in which a precise, and preferably proportional, relationship can be established between a command value and the rotary take-off drive speed of the coupling utilizing a simplified mechanism.

To realize this object, a fluid coupling of the type described in the introduction to this specification is used. On its secondary coupling part, it has the control device for regulating the rotary drive speed. There is established a new device for transmitting the adjustable command variable from a region outside the coupling to the control device which rotates with the secondary coupling half.

According to the invention, on the secondary coupling half, there is a fluid container which revolves with this coupling half and in which a stationary supply line for control fluid opens out. The fluid container has a permanent outlet opening at a distance $(r+a)$ from the axis of rotation of the coupling, in which "a" is the distance from the permanent fluid outlet to the radially inner surface of the operating fluid which is driven outwardly within said container by centrifugal force and "r" is the distance from the said surface of said operating fluid and the axis of rotation.

The invention provides means for transmitting the variable command value from a zone outside the coupling to the control device revolving with the secondary coupling half. The advantage of this device lies in the fact that no distortion of the command value occurs when the command value is transmitted to the rotating coupling. The control is thus independent of the rotary drive speed except for a slight drift which is immediately self correcting when an appreciable change in speed occurs. For this purpose, said control fluid container which revolves with the secondary coupling part and through which there is a continuous flow of control fluid through the permanent outlet opening, is arranged next to the working chamber of the coupling in which the working fluid used for the transmission of torque is located.

Normally, the pressure of the fluid inside a rotating container depends on the rotary speed at which the container is revolving. However, the invention makes use of the fact, suitably adapted, that the fluid pressure becomes independent of the rotary speed if, as already mentioned, provision is made for a continuous flow of fluid through the container. Then the pressure of the fluid at a given point in the rotating container depends only on the amount of fluid supplied per unit of time. Although a change in the rotary speed results in a brief temporary change in the fluid pressure, this causes an immediate and equally transitory change in the flow at the permanent outlet, so that the free fluid level in the container is established at another radius and the fluid pressure again assumes its original value, assuming the supply flow remains unchanged.

According to the invention, provision is made to transmit the command value to the coupling in the form of the flow of fluid supplied per unit of time. This value, as previously explained, is converted in the control fluid container revolving with the secondary coupling half to a pressure which is independent of the rotary speed, this pressure then being inserted in the control device as a command value. Consequently, it is now possible in a very simple manner to establish a relationship between the flow of control fluid and the rotary drive speed of the coupling.

Preferably, the control device will be designed in such a manner that, in a known way, it comprises an adjustable control piston which may be loaded on one side by centrifugal force dependent on the rotary drive speed and on the other side, counter to the centrifugal force, by a force which depends on the command value. A particularly simple construction of the control device is obtained if the above-mentioned force dependent on the command value is applied to the control piston in the form of the control fluid pressure.

When it is essential to establish as precise a proportional relationship as possible, between the flow of control fluid supplied and the rotary drive speed to be regulated, then, as an additional concept, the surface of the control piston is located near or at the same distance from the axis of rotation of the coupling as is the permanent outlet opening.

Preferably, a coupling according to the invention will be constructed as a hydrodynamic coupling, the rotary drive being adjusted by varying the amount of working fluid flowing continuously out of the working chamber of the coupling, this being preferably by means of an outlet valve, the movable valve body of which may be adjusted by the control device. At the same time, working fluid, preferably cooled, is continuously returned to the working chamber so that there is an external circuit for the working fluid. When a coupling for a particularly high output is required, it is expedient to adapt the flow of working fluid to the coupling slip and thus to the prevailing loss of heat, in a known way in the external circuit, this being by adjustment of the flow of working fluid supplied by means of an inlet control valve. In a known coupling (see German Pat. No. 1,237,388) the inlet control valve is linked via a cam plate with a movable scooping tube which regulates the amount of working fluid removed, so that both the control elements are always adjusted simultaneously. Alternatively, it is possible with the coupling according to the invention to control the inlet control valve independently of the outlet valve, since the control device provided according to the invention can, without any difficulty, balance out a change in the amount of working fluid supplied which represents a disturbance variable within the preset limits. This may be accomplished by the use of an outlet throttle valve for varying the amount of fluid conducted away and an inlet control valve which may be adjusted so that the temperature of the fluid conducted out of the opening remains below a preset value.

Objects and features of the invention will become apparent from the following description considered with reference to the accompanying drawings.

BRIEF DESCRIPTION OF THE DRAWINGS

FIG. 1 schematically shows a hydrodynamic coupling according to the invention,

FIG. 2 is a fragmentary constructional view in longitudinal section of the hydrodynamic coupling shown in FIG. 1, and FIGS. 3 and 4 schematically show other embodiments of hydrodynamic couplings with a flow of working fluid which may be varied in the filling line.

DESCRIPTION OF THE PREFERRED EMBODIMENTS

Figure 3:
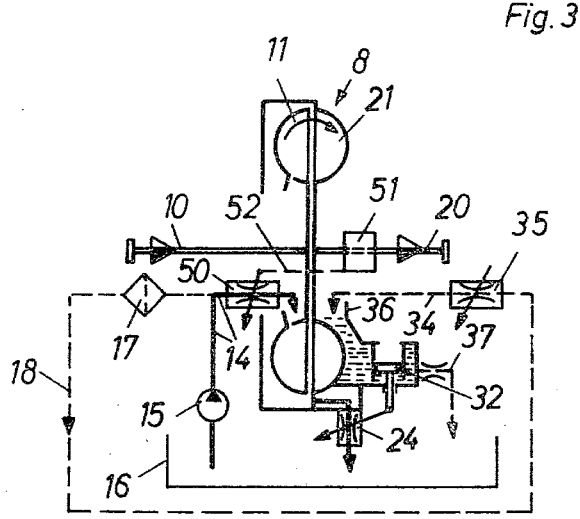

The fluid coupling 8 shown in FIGS. 1 and 2 is constructed as a hydrodynamic coupling. It comprises a primary shaft 10 with a primary bucket wheel, or bladed wheel or impeller 11, and a secondary shaft 20 with a secondary second bucket, or bladed wheel or turbine wheel 21. The secondary bucket wheel 21 forms a toroidal working chamber with the primary bucket wheel 11. A coupling shell 22 is attached to the secondary bucket wheel 21 and surrounds the primary bucket wheel 11. An annular collecting trough 12 is arranged on the rear face of the primary bucket wheel 11 to supply the working fluid to the toroidal working chamber. The trough 12 is connected to the working chamber of the coupling via inlet openings 13. A filling line 14 has an outlet into the collecting trough 12. The filling line 14 leads from a filling pump 15 which draws working fluid from a storage reservoir 16, which may also act as a cooler. A drainage or return line 23 with an adjustable outlet throttle valve 24 is arranged on the coupling shell 22, for the continuous removal of working fluid from the working chamber. The valve is controlled by motion of the below described piston 32.

Referring to FIG. 1, attached to the rear face of the secondary bucket wheel 21 there is a container 36 which is open at the radially inwardly facing side thereof, which faces toward the axis of rotation of the coupling. This container extends into the radially outermost region of the coupling at a point on the circumference of the coupling. A cylinder 31 having a control piston 32 in it is arranged in the container 36, with the common axes of the cylinder and the piston extending in the radial direction of the coupling. The control piston 32 has a piston rod 38 that is connected mechanically to the adjustment device of the outlet throttle valve 24, whereby movement of the piston 32 radially outwardly increases flow through valve 24 and opposite movement of piston 32 decreases flow through the valve. The piston 32 forms the comparator of a control device.

Centrifugal force, which depends on the mass and rotary drive speed of the control piston, acts on the control piston 32 as an operating value. The piston is blocked by fluid pressure from moving outwardly beyond a predetermined distance. To supply a command value to the control piston 32, the following provision is made. During operation of the coupling, control fluid can be supplied from a fluid source 33 to the container 36 via a stationary control line 34 with an adjustable flow valve 35. The control fluid in the container 36 is forced radially outward of the coupling by the rotation of the secondary bucket wheel 21, so that a fluid surface 30 forms, which in the case shown in FIG. 1 is a complete annular surface. The pressure of the control fluid acts on the radially outwardly directed end face 32a of the control piston 32, thus countering the centrifugal force acting on the control piston. Level with the end face 32a of the piston 32, the container has a throttled permanent outlet opening 37 for control fluid so that the control fluid flows continuously through the container 36. Due to the arrangement, the control fluid pressure loading the control piston 32 is always independent of the rotary drive speed, but depends on the distance a between the end face 32a of the control piston 32 and the fluid level 30 which is established. The distance between the fluid level 30 and the axis of the coupling is designated r.

The above-described arrangement operates as follows. If, for example, the rotary take-off drive speed increases, perhaps because of a reduction in the torque required by the secondary shaft 20, the pressure of the control fluid increases temporarily in the container 36, so that more control fluid than hitherto flows out through the throttled permanent outlet opening 37. As a result, the distance a between the piston end face 32a and the fluid level 30 becomes smaller and the control fluid pressure immediately assumes its original value again. However, since the centrifugal force acting on the control piston 32 has increased due to the increase in rotary speed, this exceeds the pressure exerted by the control fluid, so that the control piston moves outward and adjusts the outlet throttle valve 24 in the opening direction to permit exit of working fluid through valve 24 at a greater rate. This reduces the filling level in the working chamber of the coupling 8, and the rotary take-off drive speed drops again to the value which is preset by the position of the flow valve 35. The controlling forces for the piston 32 are then balanced and the rotary take-off drive speed is not a factor in the control operation except for the slight variation referred to which is balanced out almost immediately.

A change in the command value, i.e. adjustment of the flow valve 35, has the following effect. If, for instance, the amount of control fluid supplied in a unit of time is increased, this results in an increase in the distance a and accordingly, in an increase in the fluid pressure loading the end face 32a of the control piston 32. As a result, an adjustment of the outlet throttle valve 24 in the closing direction occurs. This, in turn, results in an increase of the filling level in the working chamber of the coupling 8, and a corresponding increase in the rotary take-off drive speed, until finally the forces acting on the control piston 32 are again in equilibrium.

FIG. 2 shows a possible structural design for a hydrodynamic coupling according to the invention. Corresponding parts in FIGS. 1 and 2 are given the same reference numerals. The primary shaft 10 is omitted in FIG. 2.

Attached to the secondary shaft 20, together with the secondary bucket wheel 21 there is a coupling housing 40 which surrounds the entire coupling. The outlet throttle valve 24 is installed, on the rear face of the secondary bucket wheel 21. Valve housing 41 for throttle valve 24 is installed in the outer radial region of coupling housing 40. This is a rotational body, the axis of which (relative to the axis of rotation of the coupling) is arranged radially. Co-axially with valve 24 in the valve housing 41, a hollow-bore sleeve valve 43 is inserted, with a transverse bore 44 which forms the adjustable throttle cross-section of the outlet valve 24. The valve housing 41 and sleeve valve 43 form an annular inlet chamber 42, which communicates with the working chamber of the coupling via the drainage line 23. The control piston 32 is formed onto the sleeve valve 43, as is the cylinder 31 onto the valve housing 41.

The control fluid container 36 is formed by a bore machined in a radial direction from the outside into the end wall of the coupling housing 40. This bore is closed off from the outside, while it is open towards the axis of the coupling and communicates there with the stationary control line 34. The control fluid container 36 is connected via a transverse bore 45 to the inner chamber of the cylinder 31, so that the pressure of the control fluid in the container 36 can load the end face 32a of the control piston.

At a specific distance from the axis of the coupling, which is preferably approximately equal to the distance between the axis of the coupling and the end face 32a, the container 36 has the throttled permanent outlet opening 37.

Figure 4:
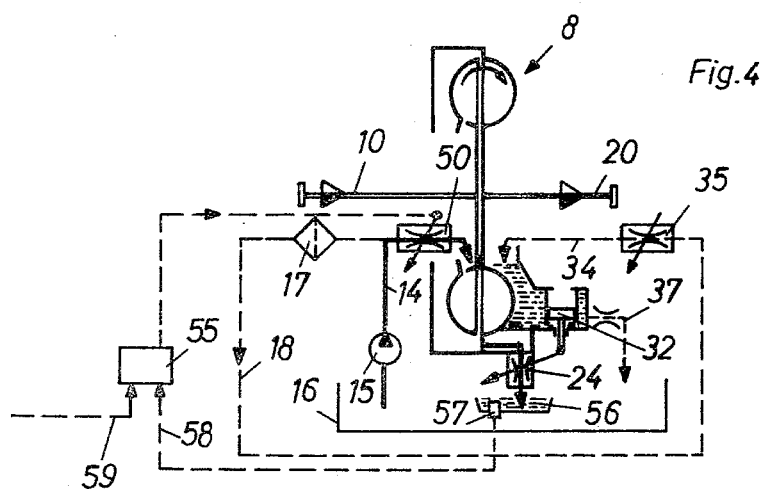

The couplings shown schematically in FIGS. 3 and 4 correspond generally to the embodiment shown in FIG. 1. The corresponding parts are again given the same reference numerals. In the couplings shown here, additional measures have been taken to achieve an adaptation of the through-put of working fluid through the coupling so that the heat caused by energy losses can be controlled and actually utilized for control. In both embodiments an inlet control valve 50 is arranged for this purpose in the filling line 14.

In FIG. 3 a tachometer 51 is connected to the secondary shaft 20 and delivers a signal for the adjustment of the inlet control valve 50 via a control line 52. By this means, assuming that the rotary speed of the primary shaft 10 is approximately constant, it is possible for the through-put of working fluid to be controlled at least approximately dependent on slip and thus to a great extent according to the heat which arises due to energy losses.

In FIG. 4 a control device 55 is provided for the adjustment of the inlet control valve 50, which can be supplied with the temperature of the working fluid after it leaves the coupling, as an operating value. For this purpose, inside the storage container 16 a temperature sensor 57 is provided in an intermediate container 56 and is connected to the control device 55 via a measuring line 58. A required value is inserted via a control line 59.

In FIGS. 3 and 4 the control fluid used to regulate the rotary drive speed is tapped off from the filling line 14 and supplied to the flow valve 35 via a filter 17 and a line 18.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A rotating fluid coupling comprising:
   a primary coupling half and a secondary coupling half which together form a working chamber which can be filled with working fluid;
   a control device connected with said secondary coupling half for rotating therewith and for regulating the rotary take-off drive speed of said coupling; said control device including comparing means for comparing an operating value, which depends on the rotary take-off drive speed, with a variable command value, and for initiating adjustment of the rotary take-off drive speed when the operating value differs from the command value;
   said control device comprising a fluid container which rotates with said secondary coupling half; said comparing means communicating with the fluid in said fluid container for being adjusted thereby; a line for delivering control fluid to said fluid container; an outlet opening from said fluid container at a radial distance from the axis of rotation of said coupling.

2. The fluid coupling of claim 1, wherein said comparing means is adapted to sense an operating value in the form of centrifugal force.

3. The fluid coupling of claim 2, wherein said comparing means comprises a movable control piston, which is shiftable radially outwardly of said coupling by centrifugal force which depends on the rotary drive speed, and which communicates on a side thereof to counter the centrifugal force thereon with a force depending on the command value in the form of the control fluid pressure to said fluid container applying pressure to said control piston.

4. The fluid coupling of claim 3, wherein said control fluid is driven centrifugally away from the axis of rotation of said coupling to create a distance "r" between the radially inner surface of said working fluid and said axis of rotation, said piston having an operating surface that is in communication with the control fluid and said operating surface of said piston is at a radially greater distance "r+a" from said axis of rotation than the distance "r."

5. The fluid coupling of any of claims 1, 3 or 4, wherein said control device is arranged on the second coupling half.

6. The fluid coupling of claim 4, wherein said outlet opening from said fluid container is located, at least approximately, at the distance r+a from the axis of rotation of said coupling.

7. The fluid coupling of claim 6 comprising an external working fluid circuit connected to said working chamber, and including an outlet throttle valve for varying the amount of working fluid conducted away from said working chamber; said throttle valve comprising a movable valve element which is connected to said control device for being adjusted thereby.

8. The fluid coupling of claim 7, further comprising an inlet control valve connected to said working chamber for adjusting the amount of working fluid supplied past said inlet control valve to said working chamber; said inlet control valve being connected with said coupling halves for being automatically adjustable according to the rotary take-off drive speed of said fluid coupling.

9. The fluid coupling of claim 7, further comprising an inlet control valve and a control device therefor which is responsive to the temperature of the working fluid for maintaining the temperature of the working fluid conducted out of said coupling below a predetermined value.

10. A rotating fluid coupling, comprising:
    a primary coupling half and a secondary coupling half which are shaped and positioned so as together to form a working chamber adapted to be filled with working fluid; means for delivering working fluid to said working chamber; an outlet valve from said working chamber and being adjustable for varying the rate at which working fluid leaves said working chamber;
    a control device connected with said secondary coupling half for rotating therewith and for regulating the rotary take-off drive speed of said secondary coupling half; said control device comprising:
    a fluid container which rotates with said secondary coupling half; a cylinder in said fluid container and a movable piston in said cylinder; said piston having an operating surface facing radially outwardly of said coupling and communicating with the control fluid in said fluid container, such that an increase of centrifugal force on the fluid in said fluid container applies pressure to said piston operating surface and urging said piston radially inwardly of said coupling and said piston also being biased radially outwardly by the centrifugal force of rotation of said secondary coupling half; said piston being connected with said working chamber outlet valve for varying flow therefrom as said piston shifts radially of said coupling, with radial outward shifting of said piston increasing the flow through said working chamber outlet valve and radially inward movement of said piston decreasing the flow through said working chamber outlet valve;
    means for delivering control fluid to said fluid container; an outlet opening from said fluid container at a predetermined radial distance from the axis of rotation of said coupling.

11. The fluid coupling of claim 10, wherein said control fluid is driven centrifugally away from the axis of rotation of said coupling to create a distance "r" between the radially inner surface of said working fluid and said coupling axis of rotation, said piston operating surface being at a radially greater distance "r+a" from said axis of rotation than the distance "r."

12. The fluid coupling of claim 11, wherein said outlet opening from said fluid container is located, at least approximately, at the distance r+a from the axis of rotation of said coupling.

* * * * *